United States Patent
Zhao et al.

(10) Patent No.: US 10,244,904 B2
(45) Date of Patent: Apr. 2, 2019

(54) CONTROLLER FOR RAISING AND LOWERING A TOILET SEAT AND COVER

(71) Applicant: Shenzhen Megmeet Elecrical Co., Ltd., Shenzhen, Guangdong (CN)

(72) Inventors: Yingjun Zhao, Shenzhen (CN); Yong Liu, Shenzhen (CN)

(73) Assignee: SHENZHEN MEGMEET ELECTRICAL CO., LTD., Shenzhen (CN)

( * ) Notice: Subject to any disclaimer, the term of this patent is extended or adjusted under 35 U.S.C. 154(b) by 1 day.

(21) Appl. No.: 15/028,024

(22) PCT Filed: Nov. 12, 2015

(86) PCT No.: PCT/CN2015/094446
§ 371 (c)(1),
(2) Date: Apr. 7, 2016

(87) PCT Pub. No.: WO2017/070989
PCT Pub. Date: May 4, 2017

(65) Prior Publication Data
US 2017/0258281 A1    Sep. 14, 2017

(30) Foreign Application Priority Data
Oct. 29, 2015 (CN) .......................... 2015 1 0715504

(51) Int. Cl.
*A47K 13/10* (2006.01)
*G01S 13/56* (2006.01)
*G01S 13/88* (2006.01)

(52) U.S. Cl.
CPC .............. *A47K 13/10* (2013.01); *G01S 13/56* (2013.01); *G01S 13/88* (2013.01)

(58) Field of Classification Search
CPC ....................................................... A47K 13/10
USPC ............ 4/246.1, 246.3–241.66, 246.3–241.6
See application file for complete search history.

(56) References Cited

U.S. PATENT DOCUMENTS

| 5,603,127 | A | * | 2/1997 | Veal | ........................ | A47K 13/10 |
| | | | | | | 4/246.1 |
| 6,202,227 | B1 | * | 3/2001 | Gurowitz | ................ | E03D 5/105 |
| | | | | | | 4/313 |
| 6,321,393 | B1 | * | 11/2001 | Jones | ..................... | A47K 13/10 |
| | | | | | | 4/246.1 |

(Continued)

FOREIGN PATENT DOCUMENTS

| CN | 101565961 A | * | 10/2009 |
| CN | 203016855 U | * | 6/2013 |

*Primary Examiner* — Erin Deery (57) ABSTRACT

A control system of an intelligent toilet includes a toilet seat actuation device for operating a toilet seat, a seat cover actuation device for operating a seat cover, and a control circuit which includes a user detector for detection of presence of a user and a micro-controller to actuate the toilet seat actuation device and the seat cover actuation device between a male operation mode and a female operation mode. In the male operation mode, the toilet seat actuation device and the seat cover actuation device are actuated for lifting up the toilet seat and the seat cover. In the female operation mode, the seat cover actuation device is actuated for lifting up the seat cover. The control system is convenient in use and prevents any contamination of the user' hands by touching the intelligent toilet.

8 Claims, 5 Drawing Sheets

(56) References Cited

U.S. PATENT DOCUMENTS

| | | | |
|---|---|---|---|
| 7,293,297 B2* | 11/2007 | Hayashi | A47K 13/10 4/246.1 |
| 8,347,423 B2* | 1/2013 | Baumoel | A47K 13/10 4/246.1 |
| 2003/0154541 A1* | 8/2003 | Miller | A47K 13/10 4/246.1 |
| 2010/0306910 A1* | 12/2010 | Chen | A47K 13/10 4/246.1 |

* cited by examiner

CONTROLLER FOR RAISING AND LOWERING A TOILET SEAT AND COVER

CROSS REFERENCE OF RELATED APPLICATION

This is a non-provisional application that claims priority to international application number PCT/CN2015/094446, international filing date Nov. 12, 2015, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an intelligent toilet, and more particularly to a control system method for the intelligent toilet.

Description of Related Arts

Intelligent toilet originated in the United States for medical use and senior care, wherein the original intelligent toilet was designed to provide a warm water cleaning function. After that, the intelligent toilet have been improved by Korea and Japan sanitary companies and introduced the toilet manufacturing technology in their countries to provide multiple functions including a heated seat function, a warm water cleaning function, a warm air drying function, and a sterilization function. The existing intelligent toilet generally provides the heated seat function, the warm water cleaning function after using the toilet, and the warm air drying function. It is worth mentioning that the intelligent toilets are originally designed for elderly and home health care. As the intelligent toilets are getting more popular, the intelligent toilets can be found and utilized in different locations. However, there are still some problems that the intelligent toilets cannot be solved.

The seat cover and toilet seat of the intelligent toilets in the public restroom (such as hotel rooms or public toilets) are opened and closed manually by the user hands, so that potential hygiene problems cannot be ignored. Therefore, it must be considered a non-contact automatic flipping function for the toilet seat and seat cover of the current intelligent toilet. In addition, different requirements for male and female are required to be applied to the intelligent toilet.

Previously, an infrared sensor is incorporated to detect a target approaching to the intelligent toilet in order to achieve an automatic flip-cover function. However, the service life span of the infrared sensor is short, and an interference problem of the infrared sensor cannot be solved. In addition, an opening is formed on a top surface of the seat cover to install the infrared sensor, such that water may leaked through the opening to damage the infrared sensor.

China Patent number: CN200920199983.0 disclosed an intelligent toilet which comprises a toilet seat and a seat cover with an automatically open and close arrangement. The toilet seat and the seat cover are pivotally connected with each other on the toilet via a seat shaft and a cover shaft, wherein the seat shaft and the cover shaft are located at the same common shaft axis. In addition, the intelligent toilet further comprises two separate motors are individually provided for the toilet seat and the seat cover respectively. In particular, A seat motor is operatively linked to the seat shaft of the toilet seat while a cover motor is operatively linked to the cover shaft of the seat cover. Each of the motors comprises an activation circuit and a control circuit. The seat shaft and the cover shaft are coupled with each other via a gear unit. The seat shaft comprises a shaft axle, a shaft sleeve, and a spring coupled between the shaft axle and the shaft sleeve, wherein an electromagnet is coupled at one end of the shaft axle. Through the electromagnetic mechanism principle and the gear mechanism principle, the toilet seat can be individually actuated to be opened via the activation of the seat motor. At the same time, the seat cover is configured to be automatically opened and closed by the sensor. In other words, the toilet seat cannot be actuated to lift up individually or to lift up along with the seat cover. Therefore, the user still needs to touch and hold the toilet seat in order to lift up the toilet seat, such that the above mentioned intelligent toilet is inconvenient and still has potential pollutant problems.

SUMMARY OF THE PRESENT INVENTION

The invention is advantageous in that it provides an intelligent toilet control system and method, which is a high intelligence device, is easy to use, and prevents any contamination of the user' hands by touching the intelligent toilet.

Another advantage of the invention is to provide an intelligent toilet control system and method, wherein the intelligent toilet comprises a toilet seat actuation device, a seat cover actuation device, and a control circuit, wherein the control circuit comprises a user detector for detection of presence of a user and a micro-controller. The toilet seat and the seat cover can be set in a male operation mode and a female operation mode. In the male operation mode, the toilet seat and the seat cover are lifted up by the micro-controller at the same time through the toilet seat actuation device and the seat cover actuation device in response to the presence of the user of the detection of the user detector. In the female operation mode, only the seat cover is lifted up by the micro-controller through the seat cover actuation device in response to the presence of the user of the detection of the user detector.

According to the above mentioned preferred embodiment, when no movement or the absence of an user is detected by the user detector, the toilet seat actuation device and the seat cover actuation device are actuated by the micro-controller for overlapping and coupling the toilet seat and the seat cover with each other in a dropped down closing position.

According to the above mentioned preferred embodiment, the user detector is a microwave detector, the toilet seat and the seat cover are lifted up by the micro-controller. The control circuit comprise a hand-free touch switch, wherein an output end of the hand-free touch switch is connected to the micro-controller. In the male operation mode, the hand-free touch switch is a foot touch switch being touched by the user's foot, such that the toilet seat is dropped down via the micro-controller through the toilet seat actuation device.

According to the above mentioned preferred embodiment, the user detector comprises two microwave detectors, wherein two ends of the two microwave detectors are connected to the micro-controller. The two microwave detectors are symmetrically arranged on a right side and a left side of a top cover respectively to detect and analyze the gesture of the user (the user's hand moves from left to right, or from right to left) in order to send output signals from the microwave detectors in sequence so as to determine whether the male operation mode or the female operation mode is set and operated. The male operation mode and the female operation mode are determined by output signals generated by the microwave detectors.

According to the above mentioned preferred embodiment, the control circuit comprises a hand-free touch switch, and output ends of the hand-free touch switch are connected to the micro-controller. When no gesture of the user is detected by the microwave detector, the hand-free touch switch can be activated, and the toilet seat and the seat cover can be lifted up by the micro-controller through the seat cover actuation device and the toilet seat actuation device via the actuation of the hand-free touch switch.

According to the above mentioned preferred embodiment, each of the toilet seat actuation device and the seat cover actuation device comprises a DC motor, a motor driving circuit, and a potentiometer, wherein two movable contacts of the potentiometer are driven by the DC motor. Two affixed ends of the resistance of the potentiometer are connected to the positive electrode of the power source and the ground respectively. The movable contacts of the potentiometer are embodied as sampling ends connected to the micro-controller in order to detect the angle of each of the toilet seat and the seat cover. The rotational speed of the DC motor is determined by the PWM. While the toilet seat and the seat cover are lifting up or dropping down, the angles of the toilet seat and the seat cover are frequently sampled by the micro-controller through the potentiometer, so the angular velocities of the toilet seat and the seat cover can be calculated. When the angular velocities of the toilet seat and the seat cover exceeds predestined values, duty cycles of the DC motor needs to be reduced.

According to the above mentioned preferred embodiment, a dropping down process of each of the toilet seat and the seat cover is divided into multiple angular sections, wherein the initial angular velocity of each of the toilet seat and the seat cover has the highest value when the toilet seat and the seat cover start to drop down. The final angular velocity of each of the toilet seat and the seat cover has the lowest value when the dropping down process of each of the toilet seat and the seat cover is completed. The lifting up process of each of the toilet seat and the seat cover is divided into multiple angular sections. The initial angular velocity of each of the toilet seat and the seat cover has the highest values when the toilet seat and the seat cover start to lift up. The final angular velocity of each of the toilet seat and the seat cover has the lowest values when the lifting up process of each of the toilet seat and the seat cover is completed.

According to the above mentioned preferred embodiment, each of the toilet seat and the seat cover is arranged at an angle of 0° when the toilet seat and the seat cover are overlapped and coupled with each other, and the angle of each of the toilet seat and the seat cover is set at 120° when the toilet seat and the seat cover are lifted up. In the falling down process of each of the toilet seat and the seat cover, the angle of each of the toilet seat and the seat cover is set between 120° to 75° when the angular velocity of each of the toilet seat and the seat cover is set at 70°/second. The angle of each of the toilet seat and the seat cover is set between 75° to 40° when the angular velocity of each of the toilet seat and the seat cover is set at 35°/second in the dropping down process. The angle of each of the toilet seat and the seat cover is set between 40° to 0° when the angular velocity of each of the toilet seat and the seat cover is set at 25°/second in the dropping down process. The angle of each of the toilet seat and the seat cover is set between 0° to 40° when the angular velocity of each of the toilet seat and the seat cover is set at 70°/second in the lifting up process. The angle of each of the toilet seat and the seat cover is set between 40° to 80° when the angular velocity of each of the toilet seat and the seat cover is set at 35°/second in the lifting up process. The angle of each of the toilet seat and the seat cover is set between 80° to 120° when the angular velocity of each of the toilet seat and the seat cover is set at 25°/second in the lifting up process.

According to the above mentioned preferred embodiment of the present invention, each of the toilet seat actuation device and the seat cover actuation device comprise a DC motor M1, a motor driving circuit, and a power-off descent circuit, wherein an output end of the motor driving circuit is connected to an output end of the DC motor, and a control end of the motor driving circuit is connected to a first control signal output end of the micro-controller (MCU). The power-off descent circuit comprises a limiting resistor, an electronic switch, and a relay, wherein the electronic switch and a control coil of the relay is serially connected, and one end of the control coil is connected to a power source, and the other end of the control coil is connected to the ground. A control end of the electronic switch is connected to an output end of a second control signal of the micro-controller; a winding of the DC motor, a limiting resistor, and the normally closed contacts of the relay are connected with each other to from a series circuit.

The user doesn't need to touch the toilet seat and/or the seat cover during the use of the intelligent toilet of the present invention, so as to prevent any contamination of the user' hands by touching the intelligent toilet and it is convenient for the user to use the present invention.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
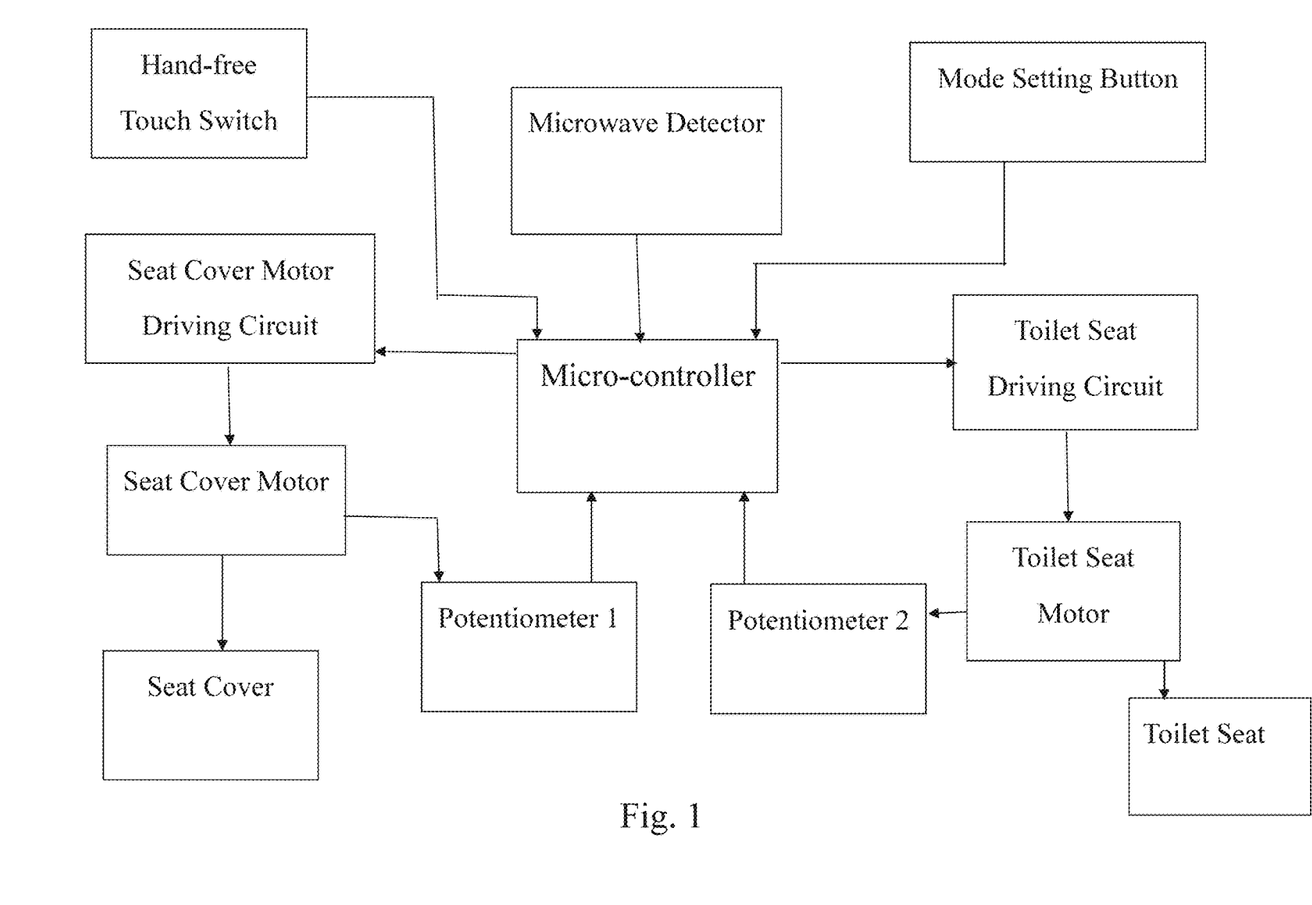
FIG. 1 is a block diagram of a control circuit of an intelligent toilet according to a preferred embodiment of the present invention.
Figure 2:
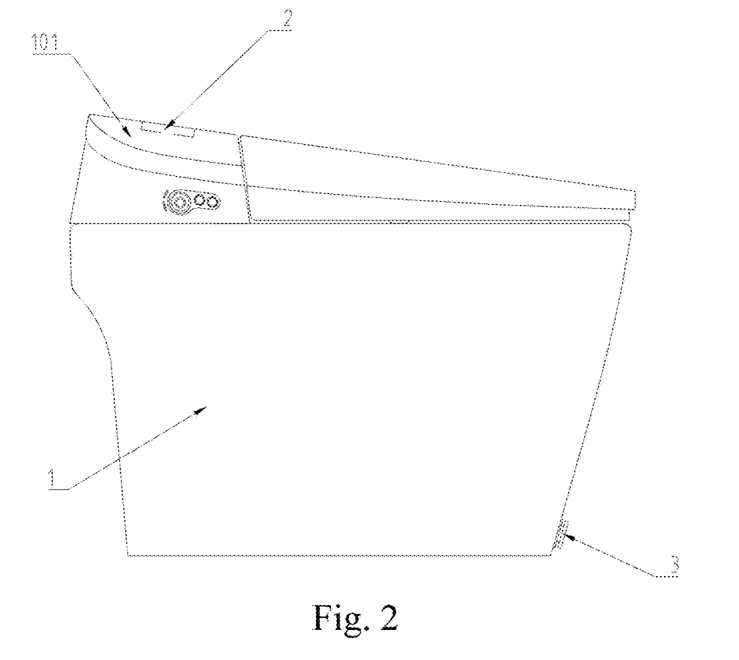
FIG. 2 is a perspective view of the intelligent toilet according to the above preferred embodiment of the present invention.
Figure 3:
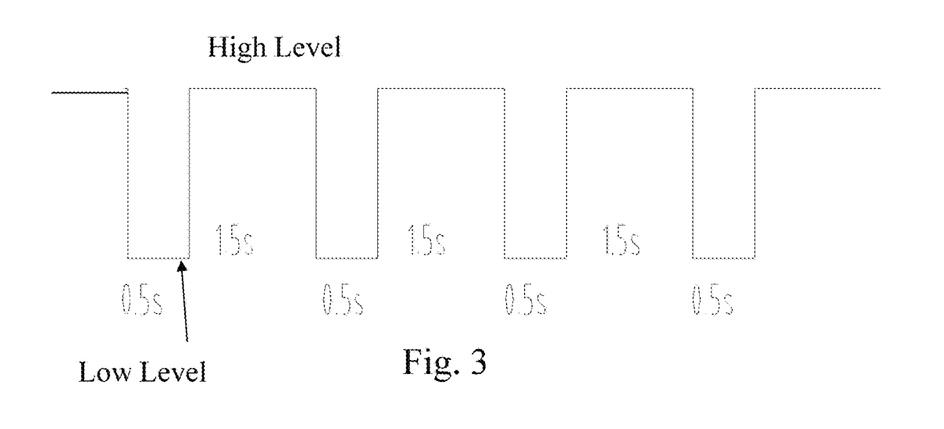
FIG. 3 shows waveforms of an output wave detected by a microwave detector during the continuous movements of the user according to a preferred embodiment of the present invention.

Referring to FIG. 1 to FIG. 3 of the drawings, a control method and system for intelligent toilet according to a first preferred embodiment of the present invention is illustrated, wherein the intelligent toilet comprises a toilet seat and a seat cover foldably coupled on a toilet body. The control system comprises a toilet seat actuation device, a seat cover actuation device, and a control circuit, wherein the control circuit comprises a microwave detector, a mode setting button, a hand-free touch switch, and a micro-controller.

Output ends of the microwave detector, the mode setting button, and the hand-free touch switch are operatively connected to the micro-controller respectively, and two output ends of the micro-controller are operatively connected to the toilet seat actuation device and the seat cover actuation device respectively.

As shown in FIG. 2, the microwave detector comprises a transceiver having a high frequency microwave emission, such as 24.125 GHz, and an antenna probe, wherein the microwave detector is operatively linked to the micro-controller (MCU) through an I/O interface circuit. The micro-controller 2 is arranged on a center portion of the top cover 101 of the toilet body 1, wherein while the microwave detector is operated to generate a 24.125 GHz electromagnetic wave for detecting an object approaching toward the intelligent toilet, such as a user moves in front of the intelligent toilet (with an angle, usually 30 degrees) based on the reflected electromagnetic wave frequency and change pattern. A detective working cycle of the microwave detector is about 1.5 seconds. The hand-free touch switch 3, such as a footstep actuation switch, is provided at the front side and the bottom end of the toilet body 1.

In order to improve the efficiency of the operation of the intelligent toilet of the present invention, the detecting range of the microwave detector 2 is defined with respect to a centerline of the toilet body 1 wherein the hand-free touch switch 3 is located, wherein the detecting range has a detection radius about 0.5 meter. While the object is detected within the range of the detection radius, a detecting signal is generated by the microwave detector 2 within 0.1 seconds.

As shown in FIG. 3, when the object is detected within the detection range (having the detection radius of 0.5 meter), a low level signal with 0.5 second pulse is generated from the output end of the microwave detector 2. The microwave detector 2 will repeatedly activated for detection for every 1.5 seconds.

Accordingly, user movements are defined as user approaching movement that the user approaches the intelligent toilet, user leaving movement that the user leaves the intelligent toilet, and user presence movement that the user is within a range of the intelligent toilet. The user approaching movement and the user presence movement are determined by the microwave detector 2 that the output end of the microwave detector 2 continuously generates the low level signals. The user leaving movement is determined that the output end of the microwave detector 2 does not generate any low level signal within 5 seconds.

The micro-controller (MCU) of the control circuit of the intelligent toilet can be pre-set at a male operation mode and a female operation mode by the mode setting button. In the male operation mode, when the male user is detected by the microwave detector, the microwave detector will generate the low level signal and send to the micro-controller (MCU) of the control circuit. Then the toilet seat and the seat cover are automatically and pivotally lifted up by the toilet seat actuation device and the seat cover actuation device. After that, if the male user wants to put down the toilet seat in the male using mode, the hand-free touch switch can be activated by stepping the male user foot on the hand-free touch switch, such that the toilet seat is pivotally dropped down by the toilet seat actuation device through the micro-controller. In the female operation mode, when the female user is detected by the microwave detector, the microwave detector will generate the low level signal and send to the micro-controller (MCU) of the control circuit. Then, only the seat cover is pivotally lifted up by the seat cover actuation device. In the other words, the position of the toilet seat is remained unchanged at its original position.

In addition, when the user leaving movement is detected by the microwave detector 2, the micro-controller is activated to close the seat cover and/or the toilet seat through the toilet seat actuation device and the seat cover actuation device. In other words, the seat cover and the toilet seat are actuated to close in the male operation mode while the seat cover is actuated to close in the female operation mode.

Figure 4:
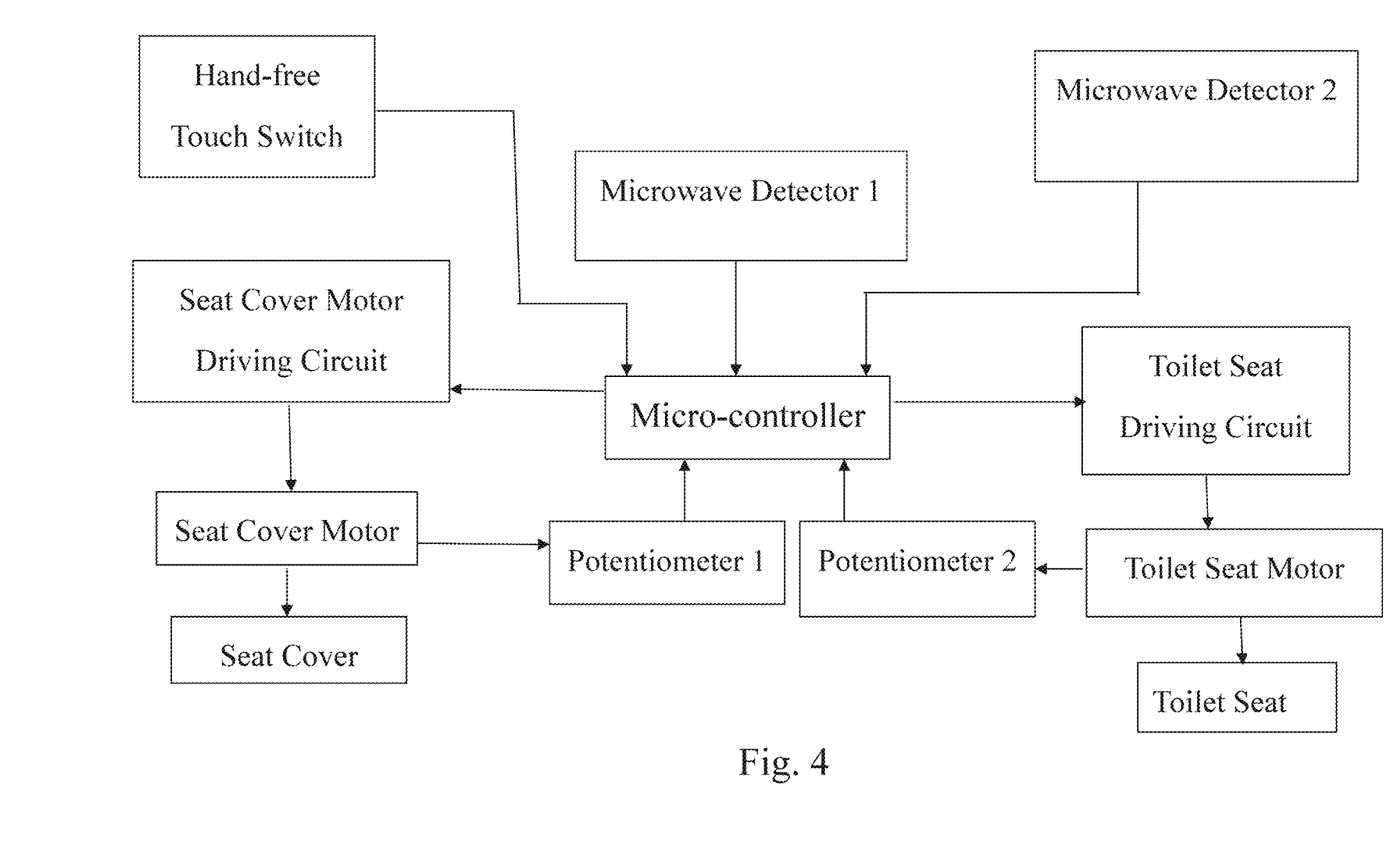
FIG. 4 is a block diagram of a control circuit of the intelligent toilet according to a second preferred embodiment of the present invention.
Figure 5:
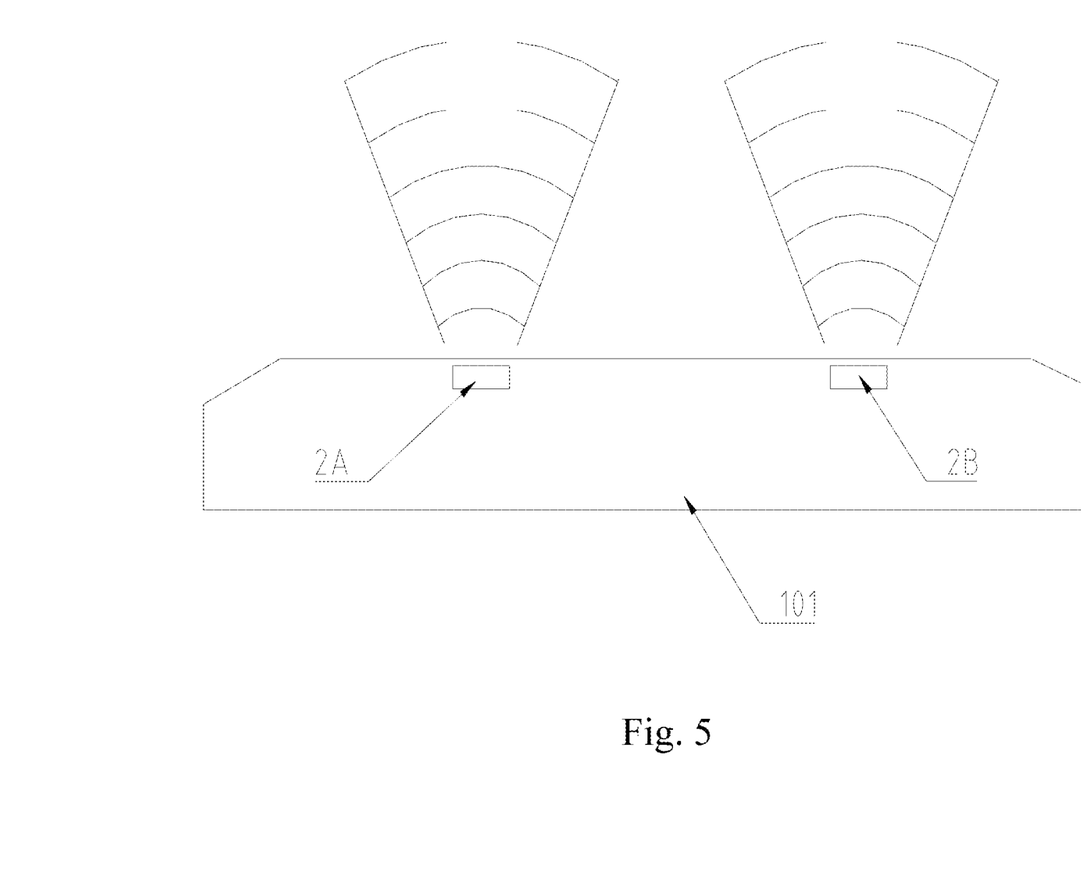
FIG. 5 is a perspective view of two microwave detectors of the control system of the intelligent toilet according to the above second preferred embodiment of the present invention.

Referring to FIG. 4 to FIG. 5 of the drawings, a control method and system of an intelligent toilet according to a second preferred embodiment of the present invention illustrates an alternative mode of the first embodiment of the present invention. As shown in FIG. 4, the intelligent toilet comprises a toilet seat actuation device, a seat cover actuation device, and a control circuit, wherein the control circuit comprises two microwave detectors 2A, 2B, a mode setting button, a hand-free touch switch, and a micro-controller. Two output ends of the two microwave detectors are operatively connected to the micro-controllers respectively. As shown in FIG. 5, the two microwave detector 2A, 2B are symmetrically arranged on a right side and a left side of a top cover 101 of the intelligent toilet respectively, wherein the two microwave detector 2A, 2B send the low level signals to the micro-controller based on a gesture of the user, and the low signals generated from the two microwave detector 2A, 2B can be analyzed by the micro-controller in order to activate the toilet seat actuation device and the seat cover actuation device.

The intelligent toilet of the present invention is configured to analysis the gesture of the user by the two microwave detectors 2A, 2B (i.e. the user hand moves from left to right, or from right to left) in order to determine whether the male operation mode or the female operation mode is operated. The male operation mode and the female operation mode are determined by the micro-controller.

For example, when the gesture of the user is detected by the microwave detector from left to right, the intelligent toilet is set in the male operation mode that the toilet seat and the seat cover are activated by the MCU. In other words, the male operation mode and the female operation mode are not set by the MCU.

When the gesture of the user is detected by the microwave detectors from right to left. The seat cover is activated to be opened by the MCU, and the toilet seat is remained at its original position, and at the same time, the intelligent toilet is set in the female operation mode (or male defection mode).

According to the present invention, the gesture of the user (from left to right or from right of left) is configured as a 1/0 input signal for the MCU, wherein the toilet seat and the seat cover can be activated to lift up by the 1/0 input signal.

When the movement of the user is detected by the microwave detectors, the low level signal generated from the microwave detector and the hand-free touch switch need to be incorporated in order to activate the lift-up motion of the toilet seat and the seat cover. For example, the hand-free touch switch can ensure that the toilet seat and the seat cover are lifted up while the gesture of the user, especially for the elder, cannot be clearly determined by the microwave detectors.

According to the above mentioned invention, the toilet seat and the seat cover can be lifted up by the MCU while the movement of the user is detected by the microwave detectors, so that the user doesn't need to touch the toilet seat and the seat cover in order to lift them up. In other words, the toilet seat and the seat cover can be individually activated to lift up or remained at their original positions through the gesture of the user.

According to the first embodiment of the present invention, the intelligent toilet comprises one microwave detector and one hand-free touch switch, wherein the male operation mode and the female operation mode can be selectively interchanged. In the male operation mode, while the movement of the male user is detected by the microwave detector, the low level signal is received by the MCU to lift up the toilet seat and the seat cover. The toilet seat can be activated to drop down while the hand-free touch switch is activated by the foot of the male user. In the female operation mode, only the seat cover is activated to be lifted up by the MCU, and the toilet seat is remained at its original position.

According to the second preferred embodiment of the present invention, the intelligent toilet comprises at least two microwave detectors, wherein the male operation mode and the female operation mode can also be selectively interchanged. While the gesture of the user is detected by the microwave detectors from left to right, the intelligent toilet is set in the male operation mode (urinating mode for male), and then the toilet seat and the seat cover are activated to be lifted up by the MCU. While the gesture of the user is detected by the microwave detectors from right to left, the intelligent toilet is set in the female using mode (or male defecation mode). Then, only the seat cover is activated to be lifted up by the MCU, and at the same time the toilet seat is remained at its original position.

The control system of the present invention further comprises an automatic damping module for the dropping each of the toilet seat and the seat cover in a damping motion, wherein the damping module is activated by the activation of the DC motor. The DC motor comprises five pins, wherein a first pin 1 and a second pin 2 are a positive electrode and a negative electrode of the DC motor respectively, which can control the rotational power of the DC motor. A third pin 3, a fourth pin 4, and a fifth pin 5 are connected with a potentiometer, wherein two ends of a resistance of the potentiometer are connected to the third pin 3 and the fourth pin 4. The third pin 3 is a +5V pin, and the fourth pin is a GND pin. The fifth pin 5 is connected to a slider of the potentiometer, which is an AD sampling pin (voltage sampling), and is adapted to be a sampling end connected with the micro-controller to sample different angles of the toilet seat and the seat cover.

An activation of the DC motor is determined by controlling the voltage between two ends of the DC motor in order to achieve a forward rotational power and a reversal rotational power. For example, if the first pin 1 is a positive pin of the DC motor and the second pin 2 is a negative pin of the DC motor, the DC motor can be activated to generate the forward rotational power, wherein the first pin 1 has a high level voltage, and the second pin 2 has a low level voltage. In other words, when the first pin 1 has a low level voltage, and the second pin 2 has a high level voltage, the DC motor can be activated to generate the reversal rotational power. While both the first pin 1 and the second pin 2 have the high level voltages, the DC motor is non-operated. In other words, when both the first pin 1 and the second pin 2 have the low level voltages, the DC motor is non-operated also.

There are two methods to adjust a rotational speed of the DC motor:

1. The rotational speed of the DC motor can be determined by the voltage difference between the first pin 1 and the second pin 2, wherein when the voltage difference between the first pin 1 and the second pin 2 is relatively larger, and the rotational speed of the DC motor will be relatively larger.

2. The rotational speed of the DC motor can be determined by the PWM (pulse width modulation), wherein the voltage difference between the first and second pins 1, 2 is modified by the PWM as a square wave. If the duty cycle of the square wave generated from the DC motor is small, the rotational speed of the DC motor is relatively smaller.

Preferably, the second method for adjusting the rotational speed of the DC motor is applied to the present invention.

Currently, the controlling angle of each of the toilet seat and the seat cover is from 0° to 120° with respect to the toilet body. (0° to 120° is an optimum angle, and a practical angle is between 0° to 110°).

When each of the toilet seat and the seat cover is arranged at an angle of 0°, the toilet seat and the seat cover are overlapped and coupled with each other. In other words, while the angle of each of the toilet seat and the seat cover is set at 120°, the toilet seat and the seat cover are lifted up.

If the toilet seat and the seat cover are lifted up, the angle of each of the toilet seat and the seat cover can be detected by the potentiometer, and the angle of each of the toilet seat and the seat cover is between 110° to 120°. In order to drop down the toilet seat and the seat cover, the DC motor is required to be rotated while the duty cycle of the square wave is 100%, and the angles of the toilet seat and the seat cover are sampled by the potentiometer.

1. While the DC motor is rotated within the angle between 120° to 75°, the rotational speed of the DC motor can be calculated as 70 degree/second, and the calculation method of the rotational speed is described as following:

Currently, the A/D chip (analog-digital converter) is sampled by 10-bit sampling method, wherein 5V is divided into 1024 sections. Each section has its corresponding voltage, and the voltage is converted to A/D value by the single-chip microcomputer.

If the voltage corresponding to 120° is 3.5V, the A/D value is 716.

The A/D value is calculated per 0.5 second. The rotational speed of the DC motor is determined by the unit change of the A/D value.

For example, a first sampling A/D value is 120°, and a second sampling A/D value is 85°, so that a rotational angle of the DC motor is 120°−85°=35°. Therefore, an angular velocity of the DC motor is 70 degree/second.

If the actual rotational speed of the DC motor is larger than 70 degree/second, a value of the duty cycle is adjusted down by the PWM through PI algorithm. If the actual rotation speed of the DC motor is smaller than 70 degree/second, a value of the duty cycle of the square wave is adjusted up by the PWM through PI algorithm. (The value of the duty cycle of the square wave doesn't reach to 100%)

2. An angle of the DC motor is between 75° to 40°, and the angular velocity thereof is controlled at 35 degree/second.

3. An angle of the DC motor is between 40° to 0°, and the angular velocity thereof is controlled on 25 degree/second.

The principle for lifting up and dropping down processes of the toilet seat and the seat cover are the same, excluding the setting value of the angular velocity and the rotational speed.

When the toilet seat and the seat cover are overlapped and coupled with each other, the angle of the DC motor detected by the potentiometer is 0°.

The intelligent toilet control method comprises the following steps:

1. The DC motor is required to be rotated while the duty cycle of the square wave is 100%, and the angle of the DC motor is sampled by the potentiometer 2. The angle of the DC motor is between 0° to 45°, and the angular velocity thereof is controlled at 70 degree/second.

3. The angle of the DC motor is between 45° to 80°, and the angular velocity thereof is controlled at 35 degree/second.

4. The angle of the DC motor is between 80° to 120°, and the angular velocity thereof is controlled at 25 degree/second.

Figure 6:
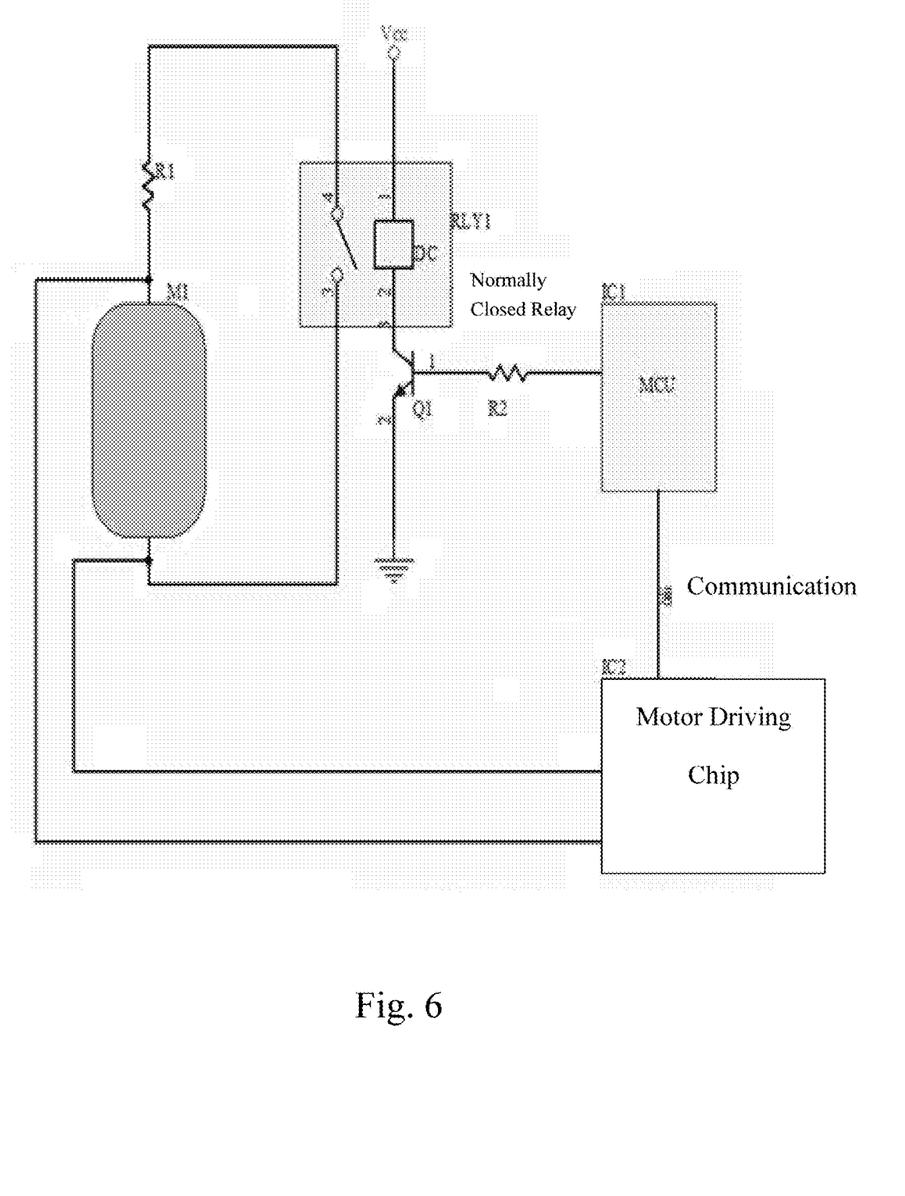
FIG. 6 is a schematic diagram of a power-off descent circuit according to a third preferred embodiment of the present invention.

A principle of a power-off descent circuit according to a third preferred embodiment of the present invention is shown in FIG. 6.

The automatically lifting up and dropping down motion of the toilet seat and the seat cover can be achieved by the automatic damping arrangement and the MCU control circuit. The power-off descent circuit is a protection circuit for the MCU control circuit. In the normal condition, the power-off descent circuit is idle. The power-off descent circuit only operates in a power failure situation in order to prevent the toilet seat and the seat cover being dropped down at the excessive rapid speed.

Each of the toilet seat actuation device and the seat cover actuation device comprises a DC motor M1, a motor driving chip DRV 8843, a power-off descent circuit, wherein an output end of the motor driving chip DRV 8843 is connected to an output end of the DC motor, and a control end of the motor driving chip is connected to a first control signal output end of the micro-controller (MCU). The power-off descent circuit comprises a limiting resistor R1, a triode Q/l, and a relay RLY1. A collector of the triode Q1 is connected to a first end of a control coil of the relay RLY1, and an emitter of the triode Q1 is connected to the ground. A second end of the control coil of the relay RLY1 is connected to a power source, and a base electrode of the triode Q1 is connected to an output end of a second control signal of the micro-controller through a resistance R2. Normally, a winding of the DC motor M1, a limiting resistor R1, and a relay RYL1 are connected together in a closed contact manner to from a series circuit.

In the power-on situation, the operation of the relay RLY1 is controlled by the MCU through the resistance R2 and the triode Q1, wherein when the closed contact of the relay RLY1 is opened, the DC motor M1 can be activated by the motor driven chip IC2. (dual H-bridge motor driver IC DRV8843 from Texas Instruments)

In the power failure situation, the closed contact of the relay RLY1 is automatically closed by the internal spring mechanism. The resistance R1 and the motor winding are connected with each other to from a closed-loop circuit. When the motor is rotated by an external force, a current is generated within the closed-loop circuit, and the current is consumed by an internal resistance of the resistance R1 and the motor winding. The rotation of the motor can be offset by the current, so that the toilet seat and the seat cover can be slowly put down.

The present invention provides a high frequency microwave detection technique, which is adapted to achieve an automatic detecting and lifting up function for the toilet seat and the seat cover, and the intelligent toilet can be selectively operated in the male or female operation mode by the gesture of the user. At the same time, the automatic damping arrangement is applied to the lift-up and drop down motion of the toilet seat and the seat cover in order to achieve a normal lifting up speed of the toilet seat and the seat cover, and in the power failure situation, the toilet seat and the seat cover cannot be rapidly dropped down. In addition, the hand-free touch switch is provided for different ages and different heights of users.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A control system applied to a toilet, the toilet comprising:

a toilet seat and a seat cover;

the control system comprising a toilet seat actuation device which comprises a toilet seat motor which drives said toilet seat to pivotally move, a seat cover actuation device which comprises a seat cover motor which drives said seat cover to pivotally move, and a control circuit, which comprises a user detector configured to detect whether a user is present in a detecting range of the user detector, and a micro-controller, wherein said toilet seat motor and said seat cover motor are configured to be actuated by the micro-controller of said control circuit in a male operation mode, a female operation mode or a closed mode, wherein said toilet seat motor and said seat cover motor are configured to be actuated in said male operation mode by said micro-controller to lift up said toilet seat and said seat cover, wherein said seat cover motor is further configured to be actuated in said female operation mode by said micro-controller to lift up said seat cover, wherein said toilet seat motor and said seat cover motor are further configured to be actuated in said closed mode by said micro-controller to overlap said seat cover with said toilet seat for closing the toilet, wherein said control circuit is configured to preset, for each of said toilet seat and said seat cover, angular velocities for multiple angle ranges during lifting or dropping of said toilet seat and said seat cover, wherein the angular velocity of said toilet seat motor corresponding to each angle range of said toilet seat is constant, and the angular velocity of said seat cover motor corresponding to each angle range of said seat cover is constant, wherein said angular velocities of said toilet seat motor corresponding to different angle ranges of said toilet seat are different, and said angular velocities of said seat cover motor corresponding to different angles of said seat cover are different, wherein said toilet seat motor is further configured to be actuated such that an initial angular velocity of the toilet seat has a highest value when said toilet seat starts to lift up, and said seat cover motor is further configured to be actuated such that an initial angular velocity of the seat cover has a highest value when said seat cover starts to lift up, wherein said toilet seat motor is further configured to be actuated such that a final angular velocity of the toilet seat has a lowest value when lifting of said toilet seat is completed, and said seat cover motor is further configured to be actuated such that a final angular velocity of the seat cover has a lowest value when lifting of said seat cover is completed, wherein said toilet seat motor is further configured to be actuated such that an initial angular velocity of the toilet seat has a highest value when said toilet seat starts to drop down, and said seat cover motor is further configured to be actuated such that an initial angular velocity of the seat cover has a highest value when said seat cover starts to drop down, wherein said toilet seat motor is further configured to be actuated such that a final angular velocity of the toilet seat has a lowest value when dropping of said toilet seat is completed, and said seat cover motor is further configured to be actuated such that a final angular velocity of the seat cover has a lowest value when dropping of said seat cover is completed, wherein said user detector comprises two microwave detectors located on top of the toilet and configured for detecting and analyzing a gesture of a user, and said toilet seat motor and said seat cover motor are each further configured to be automatically actuated in said male operation mode, said female operation mode or said closed mode, with said male operation mode corresponding to a situation that said microwave detectors detect the gesture of the user from left to right, said female operation mode corresponding to a situation that said microwave detectors detect the gesture of the user from right to left, and said closed mode corresponding to the situation that said microwave detectors detect no gesture of the user.

2. The control system, as recited in claim 1, wherein said control circuit comprises a hand-free touch switch connected to said micro-controller, wherein said micro-controller is configured to actuate, when said hand-free touch switch is activated by the user's foot, said toilet seat motor to make said toilet seat drop down in said male operation mode.

3. The control system, as recited in claim 2, wherein each microwave detector has a detecting range for detecting whether the user is present within the detecting range of the microwave detector, wherein said toilet seat motor and said seat cover motor are preset in one of said male operation mode and said female operation mode, wherein when each microwave detector detects the user within said detecting range and when said toilet seat motor and said seat cover motor are preset in said male operation mode, both said toilet seat and said seat cover are lifted up, wherein when each microwave detector detects the user within said detecting range and when said toilet seat motor and said seat cover motor are preset in said female operation mode, only said seat cover is lifted up.

4. The control system, as recited in claim 3, wherein angular velocities of said toilet seat and said seat cover are controlled by said toilet seat motor and said seat cover motor respectively, wherein an angle of each of said toilet seat and said seat cover is set to be 0° in said closed mode, and the angle of each of said toilet seat and said seat cover is set to be 120° when each of said toilet seat and said seat cover is completely lifted up, wherein the angle of each of said toilet seat and said seat cover is set between 120° and 75° when said angular velocity of each of said toilet seat and said seat cover is set at 70 degrees/second in a dropping down process, wherein the angle of each of said toilet seat and said seat cover is set between 75° to 40° when said angular velocity of each of said toilet seat and said seat cover is set at 35 degrees/second in said dropping down process, wherein the angle of each of said toilet seat and said seat cover is set between 40° to 0° when said angular velocity of each of said toilet seat and said seat cover is set at 25 degrees/second in said dropping down process, wherein the angle of each of said toilet seat and said seat cover is set between 0° to 40° when said angular velocity of each of said toilet seat and said seat cover is set at 70 degrees/second in a lifting up process, wherein the angle of each of said toilet seat and said seat cover is set between 40° to 80° when said angular velocity of each of said toilet seat and said seat cover is set at 35 degrees/second in said lifting up process, wherein the angle of each of said toilet seat and said seat cover is set between 80° to 120° when said angular velocity of each of said toilet seat and said seat cover is set at 25 degrees/second in said lifting up process.

5. The control system, as recited in claim 3, further comprising a power-off descent circuit operatively linked to each of said toilet seat actuation device and said seat cover actuation device, wherein said power-off descent circuit is configured to only operate in a power failure situation of each of said toilet seat motor and said seat cover motor.

6. The control system, as recited in claim 1, wherein each microwave detector has a detecting range for detecting whether the user is present within the detecting range of the microwave detector, wherein said toilet seat motor and said seat cover motor are preset in one of said male operation mode and said female operation mode, wherein when each microwave detector detects the user within said detecting range and when said toilet seat motor and said seat cover motor are preset in said male operation mode, both said toilet seat and said seat cover are lifted up, wherein when each microwave detector detects the user within said detecting range and when said toilet seat motor and said seat cover motor are preset in said female operation mode, only said seat cover is lifted up.

7. The control system, as recited in claim 1, wherein angular velocities of said toilet seat and said seat cover are controlled by said toilet seat motor and said seat cover motor respectively, wherein an angle of each of said toilet seat and said seat cover is set to be 0° in said closed mode, and the angle of each of said toilet seat and said seat cover is set to be 120° when each of said toilet seat and said seat cover is completely lifted up, wherein the angle of each of said toilet seat and said seat cover is set between 120° and 75° when said angular velocity of each of said toilet seat and said seat cover is set at 70 degrees/second in a dropping down process, wherein the angle of each of said toilet seat and said seat cover is set between 75° to 40° when said angular velocity of each of said toilet seat and said seat cover is set at 35 degrees/second in said dropping down process, wherein the angle of each of said toilet seat and said seat cover is set between 40° to 0° when said angular velocity of each of said toilet seat and said seat cover is set at 25 degrees/second in said dropping down process, wherein the angle of each of said toilet seat and said seat cover is set between 0° to 40° when said angular velocity of each of said toilet seat and said seat cover is set at 70 degrees/second in a lifting up process, wherein the angle of each of said toilet seat and said seat cover is set between 40° to 80° when said angular velocity of each of said toilet seat and said seat cover is set at 35 degrees/second in said lifting up process, wherein the angle of each of said toilet seat and said seat cover is set between 80° to 120° when said angular velocity of each of said toilet seat and said seat cover is set at 25 degrees/second in said lifting up process.

8. The control system, as recited in claim 1, further comprising a power-off descent circuit operatively linked to each of said toilet seat actuation device and said seat cover actuation device, wherein said power-off descent circuit is configured to only operate in a power failure situation of each of said toilet seat motor and said seat cover motor.

* * * * *

UNITED STATES PATENT AND TRADEMARK OFFICE
CERTIFICATE OF CORRECTION

| | | |
|---|---|---|
| PATENT NO. | : 10,244,904 B2 | Page 1 of 1 |
| APPLICATION NO. | : 15/028024 | |
| DATED | : April 2, 2019 | |
| INVENTOR(S) | : Yingjun Zhao and Yong Liu | |

It is certified that error appears in the above-identified patent and that said Letters Patent is hereby corrected as shown below:

On the Title Page

Item (71), Elecrical should read: Electrical

Signed and Sealed this
Twenty-seventh Day of August, 2019

Andrei Iancu
*Director of the United States Patent and Trademark Office*